2 Sheets—Sheet 1.

R. CUNNINGHAM,

Assignor to E. W. BLATCHFORD and C. F. GATES.

Device for Making Water Traps.

No. 9,684. Reissued April 26, 1881.

Witnesses

John C. Tunbridge.

Willy R. S. Schultz.

Inventor

Robert Cunningham by his attorney

A. V. Briesen

2 Sheets—Sheet 2.
R. CUNNINGHAM,
Assignor to E. W. BLATCHFORD and C. F. GATES.
Device for Making Water Traps.
No. 9,684. Reissued April 26, 1881.
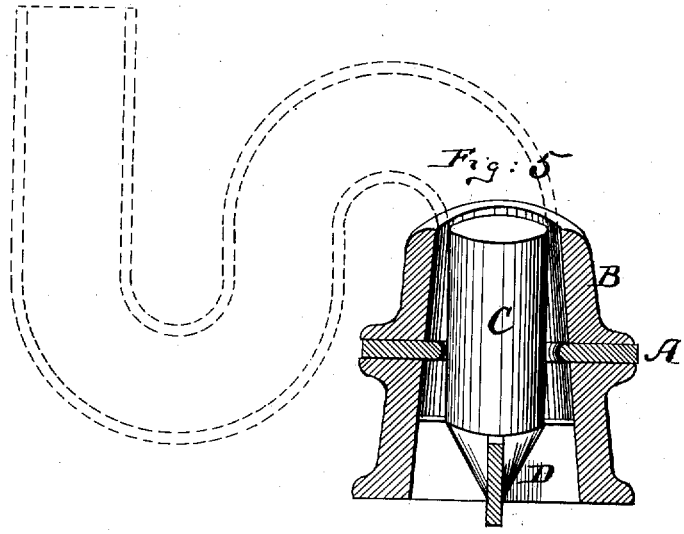
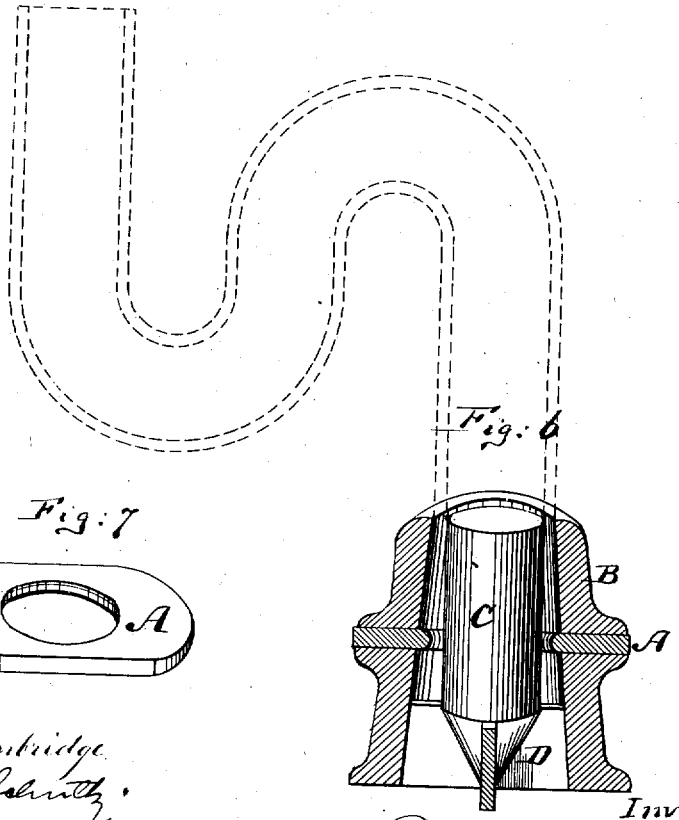
Fig: 7
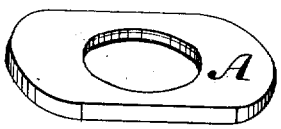
Witnesses
John C. Sunbridge
Willy G. G. Schmitz.
Inventor:
Robert Cunningham
by his attorney
A. v. Briesen

UNITED STATES PATENT OFFICE.

ROBERT CUNNINGHAM, OF CHICAGO, ILLINOIS, ASSIGNOR TO ELIPHALET W. BLATCHFORD AND CALEB F. GATES, OF SAME PLACE.

DEVICE FOR MAKING WATER-TRAPS.

SPECIFICATION forming part of Reissued Letters Patent No. 9,684, dated April 26, 1881.

Original No. 139,946, dated June 17, 1873. Application for reissue filed August 7, 1880.

*To all whom it may concern:*

Be it known that I, ROBERT CUNNINGHAM, of Chicago, in the county of Cook and State of Illinois, have invented a new and Improved Device for Making Lead or Composition Water Traps and Bends, of which the following is a specification.

Figure 1:
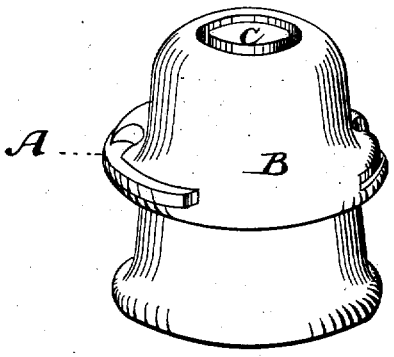

Figure 1 represents a perspective view of my improved device for making lead traps. Figs. 2, 3, 4, 5, and 6 are sectional views of the same, showing the diaphragm in the several positions for making a lead trap. Fig. 7 is a detail perspective view of the movable diaphragm.

The nature of my invention consists in a device by means of which lead or composition, in being forced through a die and around a mandrel, is graduated and controlled in its passage by a movable perforated diaphragm or gage, so that the quantity of lead or composition is increased or diminished on either side alternately, whereby it assumes any desired curve, and is thus formed into a trap or bend of uniform size and thickness in every part.

In the accompanying drawings, the letter A represents the movable diaphragm, B the die, and C the mandrel supported centrally within the die by wings D D. The die B is to be attached to a reservoir holding the lead or composition, to be forced through the die by any suitable power. Said reservoir is not shown in the drawings. The diaphragm has a central aperture, through which the mandrel passes. The diaphragm can be moved laterally, so as to regulate the quantity of lead passing through the orifice at either side of the mandrel.

Figure 2:
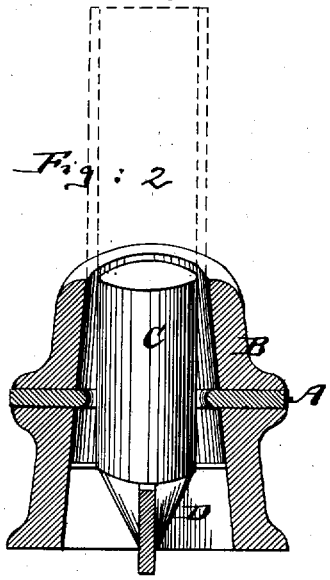
Figure 3:
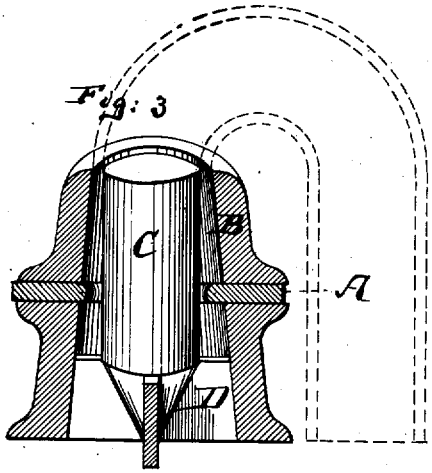
Figure 4:
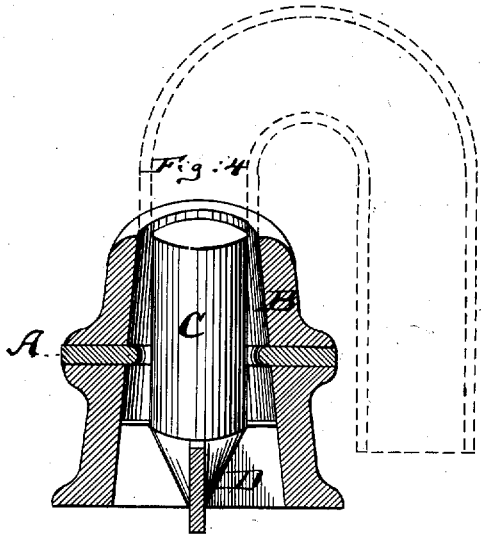

When in use, if the diaphragm A A is in the center, as in Fig. 2, the lead or composition will pass out in the form of a straight pipe. By moving the diaphragm A A to one side, as in Fig. 3, it will reduce the amount of lead or composition passing out on that side and allow it to pass out on the other side, forming a curve. Then, by moving the diaphragm A A back to the center, as in Fig. 4, the composition will pass out, as before, in the form of a straight pipe. Now move the diaphragm A A to the opposite side, as in Fig. 5, and it will reduce the amount of lead or composition passing out on that side and allow it to pass out in excess on the other side, and form a curve the reverse of the first; and by again moving the diaphragm A A to the center, as in Fig. 6, it will allow the lead or composition to pass out, forming a straight pipe.

I desire it to be understood that when I refer to a diaphragm in this specification the equivalent thereof for regulating the flow of lead on alternate sides of the mandrel is included.

I claim—

The combination of the die B and mandrel C, constructed and operated substantially as set forth, with a movable diaphragm or gage, A, for regulating the flow of the lead on opposite sides of the mandrel, substantially as specified.

ROBERT CUNNINGHAM.

Witnesses:
J. A. TROUP,
N. H. BLATCHFORD.